No. 626,049. Patented May 30, 1899.
F. H. BREWSTER.
MACHINE FOR MAKING HOSE.
(Application filed May 16, 1898.)
(No Model.) 6 Sheets—Sheet 1.
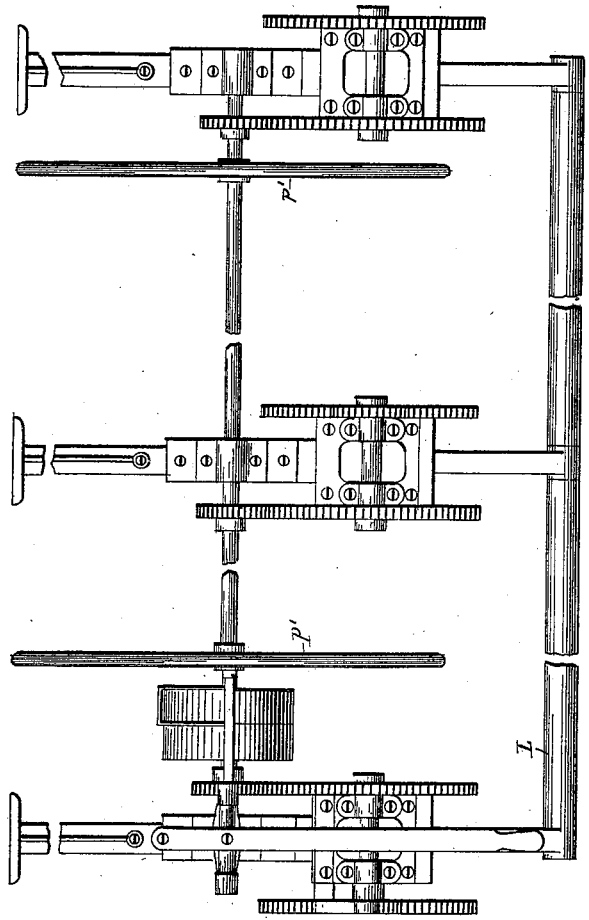
Fig. 1.
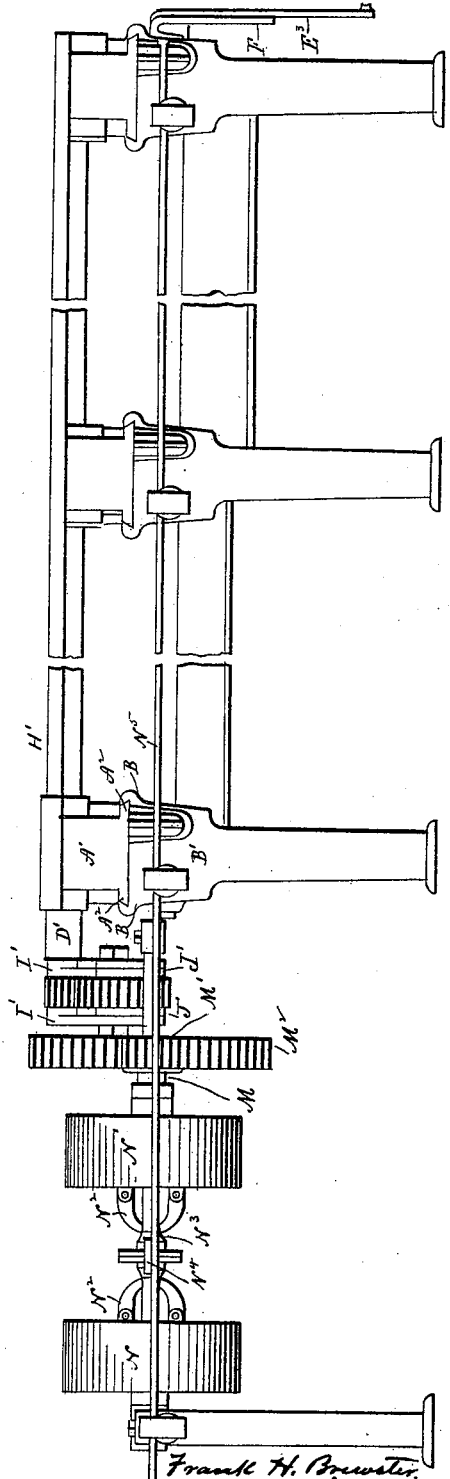
Witnesses.
Frank H. Brewster.
Inventor.
By atty No. 626,049. Patented May 30, 1899.
F. H. BREWSTER.
MACHINE FOR MAKING HOSE.
(Application filed May 16, 1898.)
(No Model.) 6 Sheets—Sheet 2.
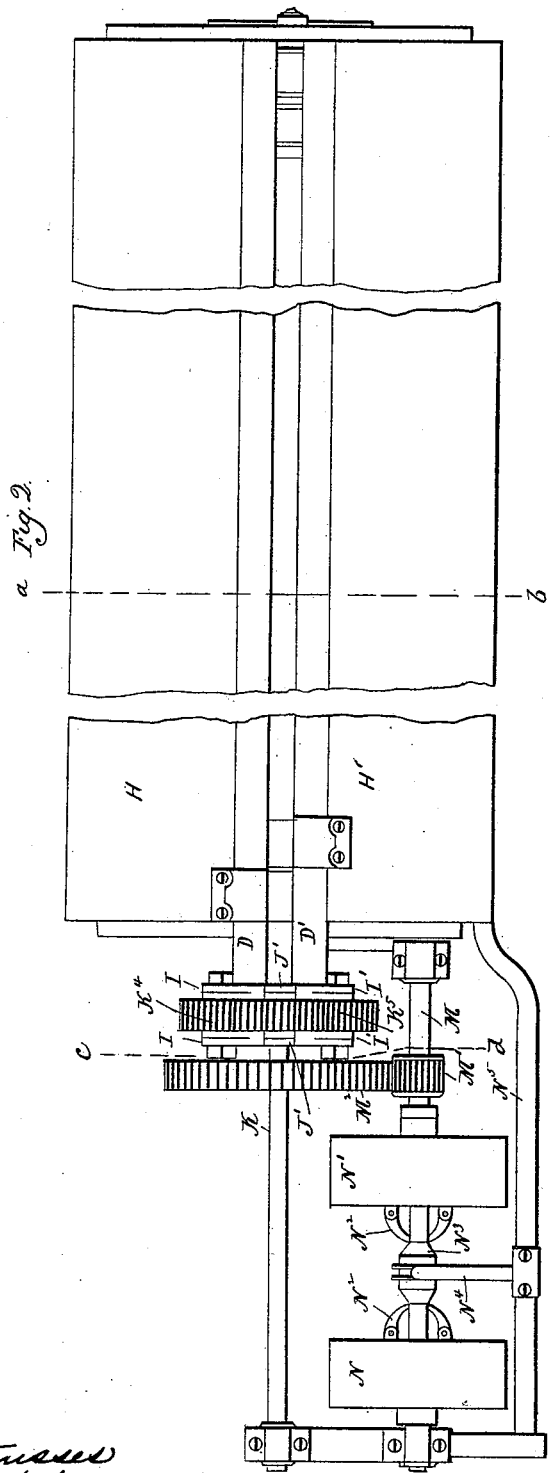

No. 626,049. Patented May 30, 1899.
F. H. BREWSTER.
MACHINE FOR MAKING HOSE.
(Application filed May 16, 1898.)
(No Model.) 6 Sheets—Sheet 3.
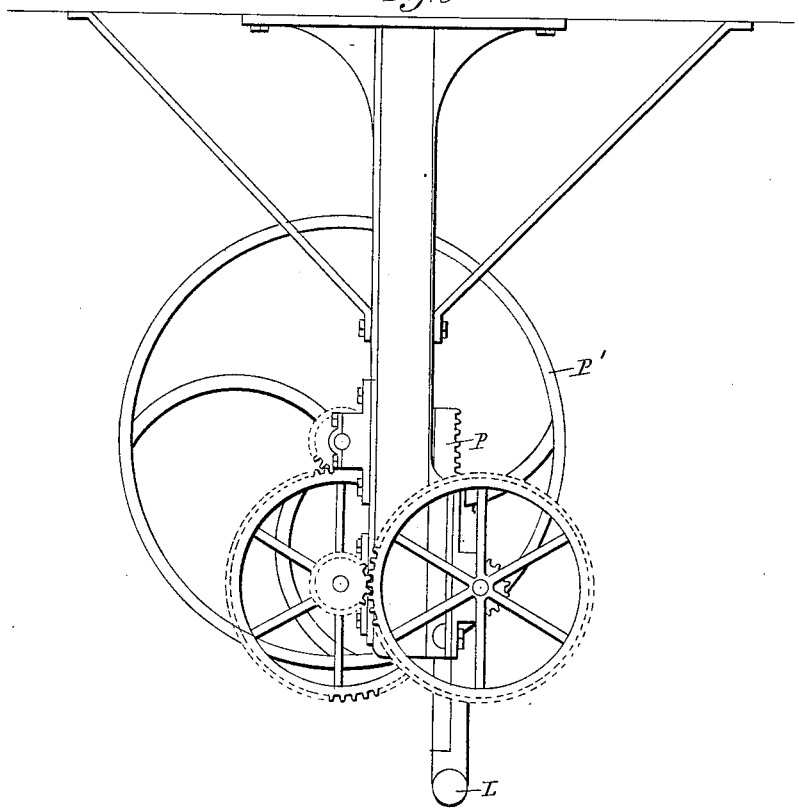
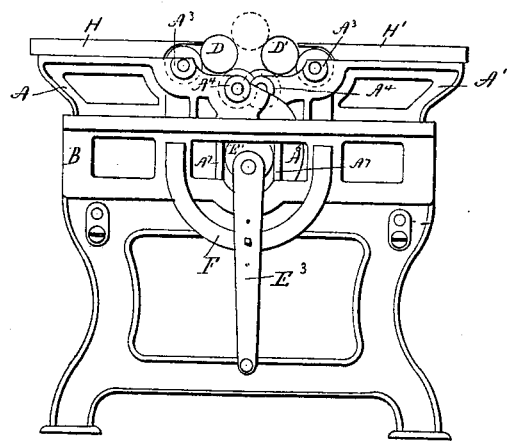
THE NORRIS PETERS CO., PHOTO-LITHO., WASHINGTON, D. C.

No. 626,049. Patented May 30, 1899.
F. H. BREWSTER.
MACHINE FOR MAKING HOSE.
(Application filed May 16, 1898.)
(No Model.) 6 Sheets—Sheet 4.

No. 626,049. Patented May 30, 1899.
F. H. BREWSTER.
MACHINE FOR MAKING HOSE.
(Application filed May 16, 1898.)
(No Model.) 6 Sheets—Sheet 5.
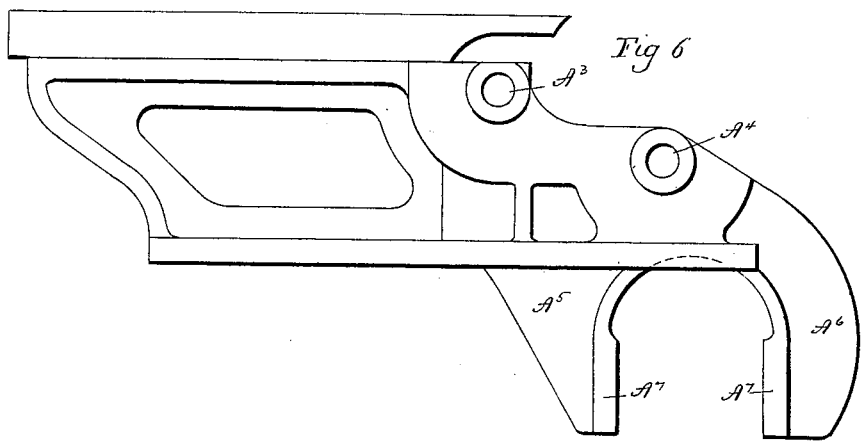
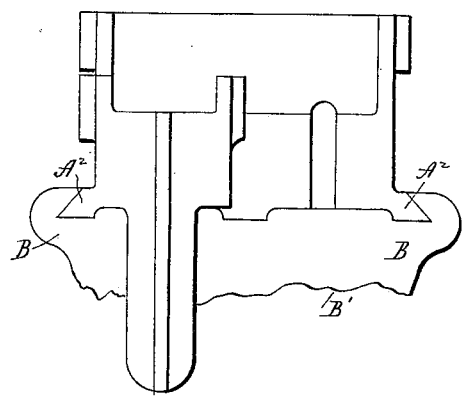
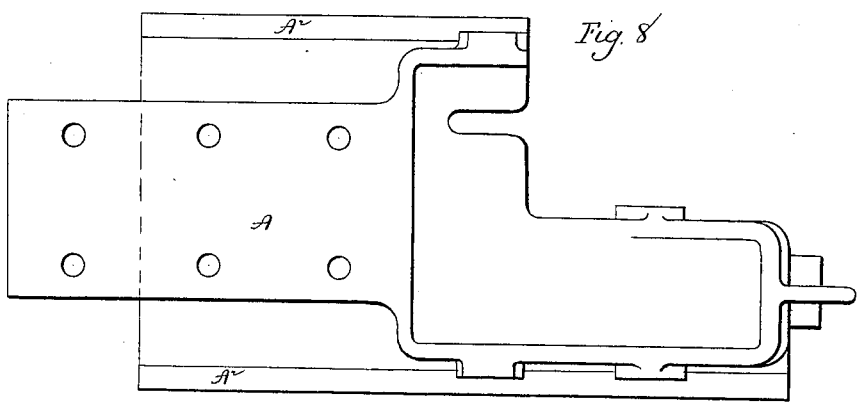
Witnesses,
J. H. Shumway.
Lillian D. Kelcy.
Frank H. Brewster
Inventor,
By Attys Earle Seymour No. 626,049. Patented May 30, 1899.
F. H. BREWSTER.
MACHINE FOR MAKING HOSE.
(Application filed May 16, 1898.)
(No Model.) 6 Sheets—Sheet 6.
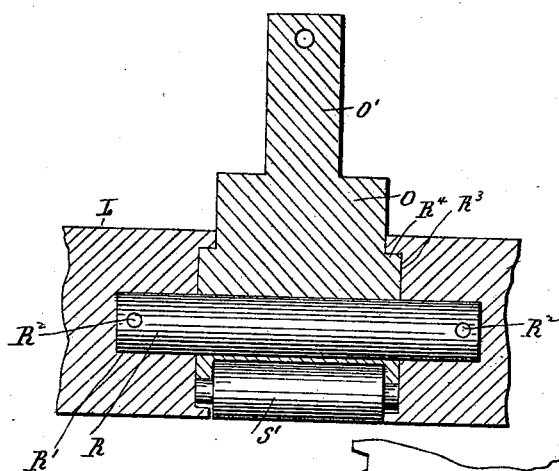
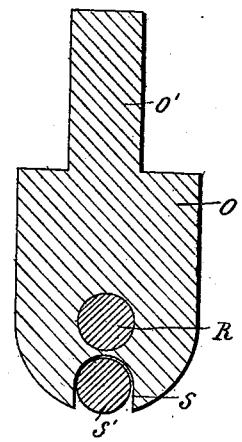
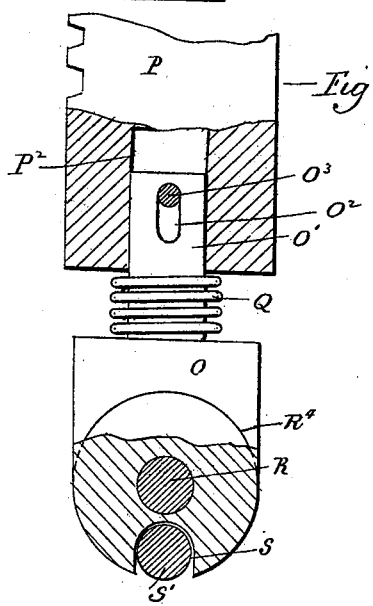
Witnesses
J H Shumway
Lillian D. Kelsey
Frank H. Brewster
Inventor
By atty Earle Seymour ated May 30, 1899.
UNITED STATES PATENT OFFICE.

FRANK H. BREWSTER, OF DERBY, CONNECTICUT, ASSIGNOR TO THE BIRMINGHAM IRON FOUNDRY COMPANY, OF SAME PLACE.

MACHINE FOR MAKING HOSE.

SPECIFICATION forming part of Letters Patent No. 626,049, dated May 30, 1899.

Application filed May 16, 1898. Serial No. 680,761. (No model.)

*To all whom it may concern:*

Be it known that I, FRANK H. BREWSTER, of Derby, in the county of New Haven and State of Connecticut, have invented a new Improvement in Machines for Making Hose; and I do hereby declare the following, when taken in connection with the accompanying drawings and the letters of reference marked thereon, to be a full, clear, and exact description of the same, and which said drawings constitute part of this specification, and represent, in—

Figure 4:
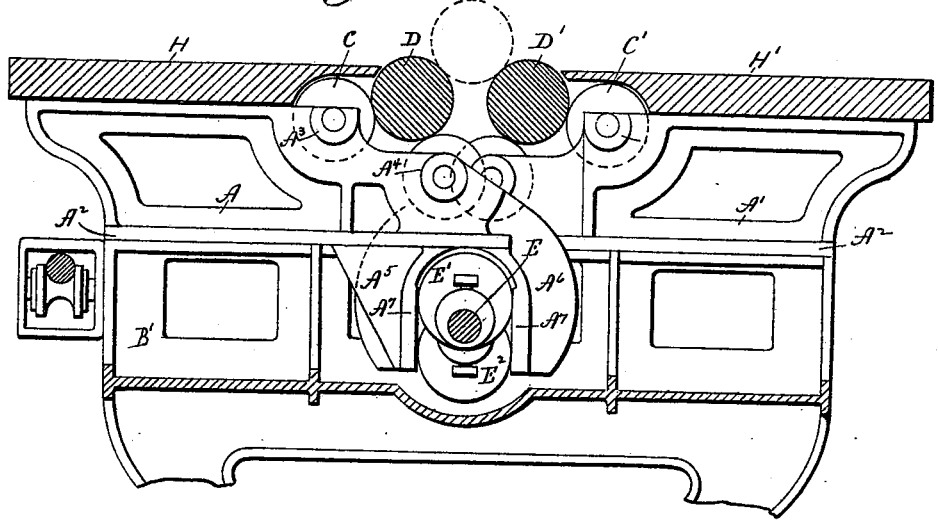
Figure 5:
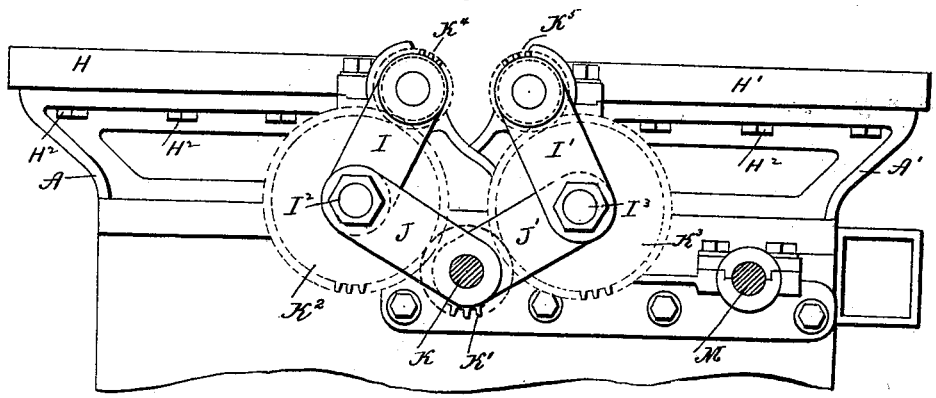

Figure 1, a view in side elevation of one form which a hose-machine constructed in accordance with my invention may assume; Fig. 2, a broken plan view thereof; Fig. 3, a view of the machine in end elevation; Fig. 4, an enlarged view of the machine, in transverse section, on the line $a\,b$ of Fig. 2, showing one pair of sliding carriers; Fig. 5, a corresponding view on the line $c\,d$ of Fig. 2, showing the driving connections of the bed-rolls; Fig. 6, a detached view, in side elevation, of one of the sliding carriers; Fig. 7, a broken view, in inside elevation, showing the mode of mounting the carriers for sliding movement back and forth; Fig. 8, a plan view of one of the carriers; Fig. 9, a view, partly in elevation and partly in section, showing the mode of connecting the adjacent ends of the two sections of the pressure-roll to a hanger-block; Fig. 10, a detached view of the hanger-block in vertical central section; Fig. 11, a broken view of the hanger-block, showing the mode of connecting it with the lower end of one of the rack-hangers.

This invention relates to an improved machine for making that class of hose which consists of a rubber tube or core surrounded by an envelop of woven fabric, the object of the present invention being to produce a simple and effective machine constructed with particular reference to being adjusted as required for interchanging poles of different diameter.

With these ends in view my invention consists in the combination, with laterally-adjustable antifriction-roll carriers, of means coacting with the said carriers for adjusting them inward or outward to any required extent.

My invention further consists in the combination, with antifriction-roll carriers, of means coacting with the said carriers for adjusting them inward or outward to any required extent and table-sections connected with the said carriers and moving therewith.

My invention further consists in employing vertically-yielding pressure-roll hanger-blocks, whereby the said roll is permitted to yield to compensate for variations in the thickness of the rubber tube and the woven fabric which is being applied thereto.

My invention further consists in certain details of construction and combinations of parts, as will be hereinafter described, and pointed out in the claims.

In carrying out my invention as herein shown I employ three pairs of sliding antifriction-roll carriers, each pair consisting of a carrier A and a corresponding carrier A'. However, the number of pairs of carriers will depend upon the length of the machine and also upon the smallest poles to be employed in the machine; nor is it necessary that the carriers should be arranged to slide, as they might, for instance, be constructed to swing or turn. As shown, the carriers are formed with dovetail ribs $A^2$, entering wide dovetail ways B, formed in the upper end of the supports or standards B' of the machine-frame. Each carrier is formed at its inner end with bearings $A^3$ and $A^4$ for the reception of the antifriction-rolls C and C', which support one of the bed-rolls D, the corresponding bed-roll D' being supported by corresponding antifriction-rolls C and C', mounted in the inner end of the other carrier A' of the same pair. Each carrier is formed at its inner end with two depending arms $A^5$ and $A^6$, the inner edges of which are shaped to form operating-faces $A^7$, which coact with eccentrics mounted upon the eccentric-shaft E, upon which the eccentrics E' and $E^2$ are arranged in pairs, the eccentric E' being located between the arms $A^5$ and $A^6$ of the carrier A and the eccentric $E^2$ being located between the corresponding arms of the carrier A'. These eccentrics are relatively arranged to extend in opposite directions, so that when the shaft E is turned the slides will be moved simultaneously in opposite directions, or, in other words, simultaneously inward and simultaneously outward. The said eccentric-shaft E is arranged under the longitudinal center of the bed of the machine and supported in suitable bearings, one of its ends being provided with a depending hand-lever $E^3$, which is secured by a clamp of any approved construction to a quadrant F, located upon the corresponding end of the machine. It will be understood, of course, that all of the eccentrics are mounted upon this shaft and that they all simultaneously coact with the carriers, which are therefore simultaneously operated in opposite directions and to the same extent. Under this construction and arrangement of parts it becomes a very easy matter to move the carriers toward or away from each other, as may be necessary for shifting the relative positions of the bed-rolls G and G', as may be required for interchanging in the machine the poles which are supplied to the machine in different sizes, so that the same may be used for producing hose from the smallest to the largest size. These poles are really mandrels, but are commonly called "poles." Such a pole has been indicated by broken lines in Fig. 2. Preferably, also, I employ table-sections H and H', which are secured to the antifriction-roll carriers, so as to be moved therewith, the said sections being adapted in length to extend between the adjacent carriers on the opposite sides of the machine. The table-sections are thus fixed in position with reference to the carriers and therefore with reference to the bed-rolls, whereby the amount of clearance between the bed-rolls and the inner edges of the tables is maintained constant to obvious advantage. I have shown the table-sections as secured to the slides by bolts $H^2$, but do not limit myself to securing them to the slides in any particular way.

Inasmuch as the bed-rolls D and D' are moved toward and away from each other to adapt them in position to interchangeably receive the poles of a series of poles differentiated in diameter, it becomes necessary to provide an adjustable or compensating connection between the bed-rolls and the means employed for driving the same. As herein shown, Fig. 4, the forward ends of the bed-rolls are respectively mounted in the upper ends of links I and I', the lower ends of which are respectively connected by studs $I^2$ and $I^3$ with the outer ends of links J and J', which are swiveled upon the driven shaft K as upon a center. The said driven shaft K carries a pinion K', meshing into wheels $K^2$ and $K^3$, respectively mounted upon the studs $I^2$ and $I^3$ aforesaid and respectively meshing into pinions $K^4$ and $K^5$, mounted upon the adjacent ends of the bed-rolls, which, it will be understood, are driven in the same direction and frictionally drive the pole, which is forced down upon them for the development of sufficient friction to secure its rotation by the pressure-roll L, which is suspended above the longitudinal center of the machine by suspension devices, which will be described later on. If desired, however, provision may be made for positively rotating the pole.

As herein shown, the driven shaft K is driven from a driving-shaft M, provided with a pinion M', meshing into a large gear-wheel $M^2$, mounted upon the driven shaft K, as shown in Fig. 2. The driving-shaft is also furnished with two driving-pulleys N and N', revolving in opposite directions and driven by belts from any convenient source of power. These pulleys are alternately brought into use by means of clutch mechanisms $N^2 N^2$, operated by a cone $N^3$, brought into play by a shipper $N^4$, mounted upon a shipper-rod $N^5$, which extends throughout the length of the machine, so that the attendant may stop the machine or start the rotation of the pole in either direction while he is standing at any point throughout the length of the machine. However, the particular mechanism for driving the bed-rolls D and D' and for permitting them to be moved toward and away from each other and for stopping and starting and reversing the machine may be widely varied, such mechanism having no direct connection with my present invention.

The pressure-roll L is made in sections, which, however, are coupled together so as to rotate as though it were made in a single piece. The said roll is suspended in hanger-blocks O, which are themselves mounted for vertical yielding movement in the lower ends of rack-hangers P, all of which are simultaneously raised and lowered through a large hand-wheel P', with which they are connected through suitable trains of gear-wheels and pinions, which are shown but not described, as they are not new with me. The said hand-wheel, however, may be replaced by power connections for raising and lowering the rack-hangers. As shown, the various adjuncts of the pressure-roll are designed to be suspended from the ceiling of the room containing the machine, but they might be arranged to be supported from a framework connected with the frame of the machine. My invention, so far as the pressure-roll is concerned, consists in employing hanger-blocks O, furnished with upwardly-projecting stems O', having slots $O^2$, receiving pins $O^3$, by means of which they are connected with the lower ends of the rack-hangers P, which are formed with holes $P^2$ for the reception of the said stems O', which are movable vertically in the said holes within the limits fixed by the length of the slots $O^2$. A spiral spring Q, interposed between the lower end of each rack-hanger and the upper end of each hanger-block and encircling the stem O' of the latter, is employed to normally hold the hanger and the pressure-rod down in its normal position and to yield to permit the hanger-block and hence the pressure-roll to lift, as required, for compensating for variations in the thickness of the rubber tube and woven fabric covering.

As shown in Fig. 9, the two adjacent sections of the pressure-roll L are coupled together by a heavy coupling-pin R, extending parallel with the length of the roll and inserted into sockets R', formed in the ends of the said sections and secured in place by transversely-arranged pins R², the adjacent ends of the sections being formed with circular recesses R³ to fit over short hubs R⁴, formed on the opposite faces of the hanger-block O, which supports the ends of the roll-sections, while the coupling-pin R couples them together and causes them to turn as one piece. In order to bridge the spaces between the ends of the roll-sections caused by the interposition between them of the hanger-blocks, I form recesses S in the lower faces thereof and set thereinto rollers S', which are rotated by friction as well as the pressure-roll and avoid the occurrence, as it were, of any dead-points throughout the length of the pressure-roll so far as the function of the same is concerned.

In view of the modifications suggested and of others which may obviously be made I would have it understood that I do not limit myself to the exact construction herein shown and described, but hold myself at liberty to make such changes and alterations as fairly fall within the spirit and scope of my invention.

Having fully described my invention, what I claim as new, and desire to secure by Letters Patent, is—

1. In a machine for making hose, the combination with antifriction-roll carriers, of means coacting with the said carriers for adjusting them inward or outward to any required extent, and table-sections connected with the said carriers and moving therewith whereby the table-sections are always maintained in the same relative positions with respect to the roll-carriers the antifriction-rolls of which support the bed-rolls of the machine.

2. In a machine for making hose, the combination with carriers, antifriction-rolls mounted therein, bed-rolls supported by the said antifriction-rolls, means for adjusting the carriers inward or outward to any required extent, and table-sections rigidly connected with the upper portions of the said carriers, and moving therewith whereby the table-sections are maintained in fixed relations with respect to the carriers and hence to the bed-rolls.

3. In a machine for making hose, the combination with laterally-adjustable sliding carriers arranged in pairs, movable toward and away from each other, having antifriction-rolls mounted in them, and provided at their inner ends with depending arms, of an eccentric-shaft extending throughout the length of the machine, and eccentrics mounted in pairs upon the said shaft in position to engage with the depending arms at the inner ends of the carriers for simultaneously moving the carriers of each pair toward and away from each other to the extent required.

4. In a machine for making hose, the combination with a sectional pressure-roll, of overhead suspension devices therefor, vertically-yielding hanger-blocks with which the sections of the roll are connected, and which move vertically for compensating for variations in the thickness of the rubber tube and fabric employed in making the hose.

5. In a machine for making hose, the combination with a sectional pressure-roll, of rack-hangers, and hanger-blocks adapted to have the sections of the roll connected with them, and suspended for vertical movement in the lower ends of the said hangers, whereby they yield to compensate for variations in the thickness of the rubber tube and woven fabric being operated upon by the machine.

In testimony whereof I have signed this specification in the presence of two subscribing witnesses.

FRANK H. BREWSTER.

Witnesses:
   FRED. C. EARLE,
   LILLIAN D. KELSEY.